April 2, 1968  G. R. CHESNUT, JR  3,375,816
COOKING APPARATUS WITH REFRACTORY LINER
Filed Feb. 1, 1965
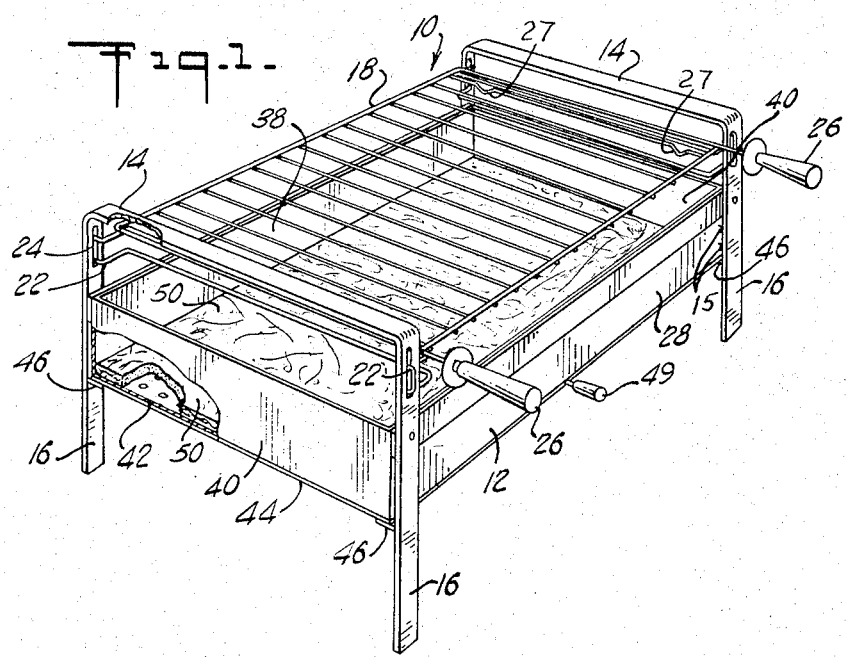
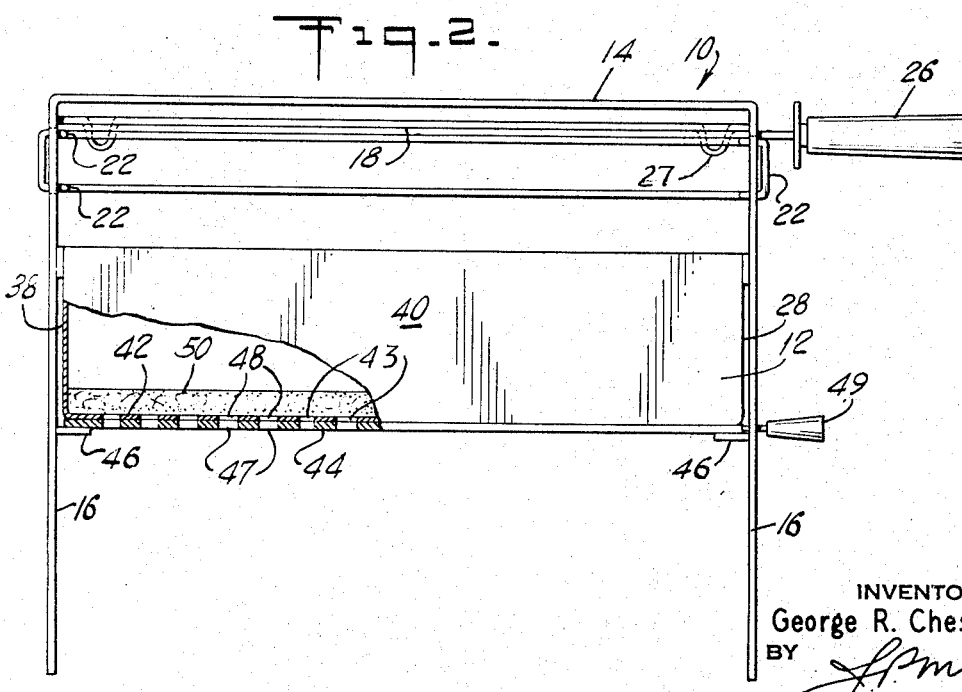
INVENTOR
George R. Chesnut, Jr.
BY
ATTORNEY

United States Patent Office 3,375,816
Patented Apr. 2, 1968

3,375,816
COOKING APPARATUS WITH
REFRACTORY LINER
George R. Chesnut, Jr., Augusta, Ga., assignor to The Babcock & Wilcox Company, New York, N.Y., a corporation of New Jersey
Filed Feb. 1, 1965, Ser. No. 429,460
2 Claims. (Cl. 126—25)

This invention relates to domestic units for heating and cooking by an open fire or hearth, and especially to outdoor cooking units, commonly referred to as barbecue grills, which use wood, charcoal, or other solid fuels.

As is well known, logs and charcoal are difficult to ignite; and there are now commercially available a number of flammable kindling fluids which may be applied directly to the solid fuel and then ignited. This common procedure for starting an open fire has a number of disadvantages, among which are inconvenience, and the danger of making a fire with high flames, involving a risk of injury to person and property.

According to the present invention, a blanket of non-combustible fibrous refractory material is employed to line the bottom of a hearth. The refractory blanket is wetted with sufficient flammable kindling liquid for starting a fire of solid fuel carried on the blanket. Thus, if at least the bottom of the hearth is lined with a refractory blanket as aforesaid, and then a flammable liquid is applied to the blanket, followed by the placement of charcoal or other solid fuel on the blanket, the fire may be safely started by igniting the flammable liquid at the upper surface of the blanket. With this procedure, flames consuming the supply of flammable kindling liquid are maintained at a safe height as the charcoal or other solid fuel is ignited.

After the refractory blanket has served its purpose during the initial start-up of the solid fuel fire, it next serves as a body of insulation capable of withstanding temperatures of 2000° F. and higher. The blanket shields the hearth from heat radiated by the burning solid fuel, thereby maintaining the hearth at low temperature and causing more heat to be reflected or directed upwardly to the cooking surface. The latter may be a grill of openwork metal construction suitably supported above the fire.

In actual practice, the hearth may be provided by a barbecue unit comprising a firepot supported above the ground by a plurality of legs, and a cooking surface in the form of a grill supported on the firepot. The firepot is usually made of steel, the surfaces of which are painted to enhance the appearance of the unit, and also to prevent metal oxidation and thereby prolong its useful life. As is well known, however, ordinary enamel paint deteriorates more rapidly when subjected to high temperatures; and it is therefore a further advantage of the present invention that the life of the painted surface is extended by reducing the metal temperature of the firepot. Furthermore, the present invention permits lower melting point metals, such as aluminum, to be substituted for steel. Many of these lower melting point materials are more corrosion resistant than steel and, therefore, they are more durable than steel for this particular use. In addition, the lower melting point materials possess greater ductility than steel, so that stamping, spinning, deep drawing, and like manufacturing methods can be employed in the making of firepots.

Still further, if the firepot is maintained at reduced temperature because of a refractory liner, there is less chance of serious personal injury resulting from contact therewith.

Yet another advantage of employing a refractory fibrous blanket as a liner for an elevated firepot is that it permits the use of apertures in the bottom thereof to provide a draft for the fire, since the liner permits the passage of air therethrough while acting as a fire screen to prevent sparks and hot ashes from falling out through the holes. Moreover, if the firepot is left outdoors with the draft open, it will not be possible for rain water to accumulate therein, since the water will pass through the blanket to the bottom of the firepot and drain out the apertures.

An additional advantage of the present invention is that, upon completion of the cooking operation, embers and ash may be conveniently disposed of, and the firepot cleaned, simply by removing the liner from the firepot by hand and discarding the residue. The liner may then be replaced, and the firepot is ready for future use.

Various other objects, features, and advantages of the invention will appear more fully from the detailed description which follows, taken in connection with the accompanying drawings forming a part of the present application, and in which:

FIG. 1 is a perspective view of a cooking unit constructed according to the invention; and FIG. 2 is a vertical sectional view of the cooking unit of FIG. 1, but on an enlarged scale.

As shown in the drawings, the invention is applied to an outdoor cooking unit or barbecue grill 10. The latter includes an enclosure defining a rectangular firepot 12 in which solid fuel, such as wood or charcoal, is burned. However, the firepot 12 may be of any suitable shape. The firepot 12 is supported off the floor or ground by means of a pair of inverted U-shaped members 14 pivotally secured to opposite ends of the firepot 12, and locked in position by dimples 15, so that the upright portions of the members 14 serve as legs 16, as illustrated. Further provided is a grill 18 of openwork metal construction adapted to support food to be cooked over an open fire in the firepot 12. The grill 18 is thus supported at a selected level on a pair of horizontal glides 19, each being made of wire and having hooked end portions 22 received in associated vertically elongated slots 24 in the upper portions of the legs 16. Handles 26 are attached to the grill 18 for convenience in handling, as for removing the grill from the glides 19 and adjusting the height of the grill above the fire in the firepot 12. The grill 18 is further provided with downwardly bent portions adjacent four corners of the grill to provide feet 27 on which the grill 18 can be supported on any suitable flat surface, such as a table.

The firepot 12 includes a vertical front wall 28, a vertical rear wall 38, a pair of opposite vertical side walls 40, and a horizontal bottom wall 42. The bottom wall 42 is provided with perforations 43 to admit air to the firepot enclosure as a draft for promoting the burning of solid fuel therewithin.

In order to control the amount of draft air, a slidable, apertured plate 44 is supported by horizontal tracks 46 beneath the perforated bottom wall 42, with apertures 47 of the plate 44 being in registry with the perforations 43 of the bottom wall 42 when a maximum quantity of draft air is to be supplied. The plate 44 is movable from side to side on the tracks 46 to adjust the draft according to the extent the perforations 43 and the apertures 47 are aligned; and a handle 49 is secured to the plate 44 to facilitate manual manipulation thereof.

The bottom wall 42 is covered with a layer or blanket 50 of fibrous refractory material. Preferably, the refractory material is noncrystalline and it is produced from molten Georgia kaolin to have a composition including approximately 52% $SiO_2$ and 45% $Al_2O_3$, with an average fiber diameter of 3 to 4 microns and a fiber length of about 2 microns to about 8 inches.

A chemical analysis of one refractory blanket material employed in practicing the invention disclosed the following approximate composition:

| | Percent |
|---|---|
| Alumina, $Al_2O_3$ | 45.1 |
| Silica, $SiO_2$ | 51.9 |
| Iron oxide, $Fe_2O_3$ | 1.3 |
| Titania, $TiO_2$ | 1.7 |
| Magnesia, MgO | Trace |
| Calcia, CaO | 0.1 |
| Alkalies as $Na_2O$ | 0.2 |
| Boric anhydride, $B_2O_3$ | 0.08 |

Such material is capable of withstanding temperatures up to 2300° F. without decomposing or changing form, such as by contact with a burning solid fuel supported on the upper surface thereof, while insulating the bottom wall 42 from the direct heat of the solid fuel fire. It can be seen, therefore, that refractory material of the type described is fire resistant when subjected to the temperatures of open fires employing either conventional kindling liquids or the well-known solid fuels, such as charcoal and wood. The blanket 50 does not deteriorate as a result of chemical reaction with known kindling liquids. The blanket may have a density of from 3 to 8 pounds per cubic foot, but a density of 6 pounds per cubic foot in a ½ inch thick blanket is preferred.

Thus, by placing a refractory blanket 50 between the bottom wall 42 of the firepot 12 and the burning solid fuel supported on the upper surface of the blanket 50, the metallic firepot is protected from the rapid oxidation of the metal normally experienced on cooking units of this kind, and paint originally applied to further protect the surface will not deteriorate due to excessive heat. Furthermore, the danger of personal injury from contact with the firepot 12 is materially reduced.

As is well known, alcohol or various other flammable liquids are available to assist in starting the solid fuel fire. According to conventional practice, these are usually sprayed, poured, or otherwise applied to the solid fuel and then ignited; and indiscriminate use of this procedure can produce such a high fire and rapid burning that serious injury to the user and bystanders can result. With this invention, however, a spark or open flame is applied to the refractory blanket 50 wetted with a flammable liquid, and a low, controlled flame is produced which spreads over the entire wetted portions of the blanket. This serves to ignite any solid fuel carried on the blanket. Moreover, all of the flammable kindling liquid applied to the blanket 50 is burned in the course of starting the solid fuel fire, so that the dry refractory blanket 50 thereafter possesses its usual insulation properties and acts as a heat barrier between the burning solid fuel and the metallic firepot 12.

To accomplish the foregoing, the blanket is constructed as a compact mass of fibers, with interstices therebetween, so that liquid applied to the blanket will tend to flow into the interstices and cling to the surfaces of the fibers. Of course, excess liquid will flow downwardly through the blanket 50 via the interstices; and, likewise, draft air can flow upwardly through the blanket via the interstices.

After the cooking or heating operation is completed, the residue of the solid fuel, whether hot or cold, may be conveniently disposed of by manually removing the grill 18 and then the refractory blanket 50. After such removal, both the blanket 50 and the interior of the firepot 12 will usually be found substantially clean and ready for the next use upon replacement of the grill 18. Moreover, it is to be understood that the refractory blanket 50 may be reused time and time again.

From the foregoing, it can be seen that fibrous refractory material may be used for the dual purpose of safely kindling the fire in conjunction with flammable liquid and also to insulate the bottom of the firepot supporting the refractory material. As explained, the fire is started by applying a flammable liquid to the refractory material, next placing the solid fuel to be burned on the refractory material, and igniting the flammable liquid.

It is a feature of the present invention that draft air may be delivered to the fire through the apertures 47 of plate 44 through the perforations 43 of the bottom wall 42 of the firepot 12, and finally through the interstices between fibers of the refractory blanket 50. The blanket 50 acts as a fire screen to prevent embers, ash, and hot sparks from falling through the draft passageway just described. Moreover, if the plate 44 is left outdoors in position to admit draft air, as shown in FIG. 2, rain water cannot accumulate in the firepot, but instead it will pass through the blanket 50, and drain out the firepot 12 through the apertures 47 and the perforations 43.

Although the invention has been shown in but one form, it will be obvious to those skilled in the art that it is not so limited, but that it is susceptible of various changes and modifications without departing from the spirit thereof as covered by the following claims.

What is claimed is:

1. In domestic cooking and heating apparatus, the combination of:
   a firepot adapted to contain an open fire of solid fuel, and including an upwardly facing bottom surface,
   a grill for supporting food to be cooked over the fire in said firepot,
   and a removable body of fibrous refractory material resting on said bottom surface and capable of holding a supply of liquid kindling fuel for first igniting said solid fuel and next insulating said bottom surface from the heat of the burning solid fuel,
   at least one aperture formed in said firepot to provide draft for the fire, and said body of refractory material covers said aperture.

2. Domestic cooking apparatus comprising:
   a firepot having an aperture formed therein to provide draft to a fire therein,
   a grill above said firepot,
   a blanket of fibrous refractory material removably disposed in said firepot and covering said aperture, said blanket being adapted to support solid fuel thereon and to insulate the firepot from the heat of burning solid fuel,
   said blanket being constructed as a compact mass of fibers so that it will hold a supply of liquid kindling fluid when wetted therewith for kindling said solid fuel, and with connecting interstices so that draft air flows first through said aperture and then the interstices of said blanket to said solid fuel, said blanket preventing embers from falling through said aperture.

References Cited

UNITED STATES PATENTS

| 1,042,273 | 10/1912 | Roe | 126—25 |
| 1,461,496 | 7/1923 | Quist | 158—10 |
| 2,120,683 | 6/1938 | Simmons | 158—10 X |
| 2,114,698 | 4/1938 | Babin | 126—25 |
| 2,419,344 | 4/1947 | Eggleston | 126—25 |
| 3,151,614 | 10/1964 | Mendelson. | |

FOREIGN PATENTS 610,978   12/1960   Canada.

CHARLES J. MYHRE, *Primary Examiner.*

FREDERICK L. MATTESON, JR., *Examiner.*

E. G. FAVORS, *Assistant Examiner.*